United States Patent [19]

Wenzel et al.

[11] Patent Number: 5,267,905
[45] Date of Patent: Dec. 7, 1993

[54] SEALED DOWNHOLE MOTOR DRIVE SHAFT UNIVERSAL JOINT ASSEMBLY

[76] Inventors: Douglas Wenzel; Robert Wenzel; William Wenzel, all of 7220 - 68 Avenue, Edmonton, Alberta, Canada, T6B 0A1

[21] Appl. No.: 566,179

[22] Filed: Aug. 10, 1990

[51] Int. Cl.$^5$ .............................................. F16D 3/221
[52] U.S. Cl. .................. 464/140; 464/141; 464/155
[58] Field of Search .............. 464/139, 141, 140, 147, 464/155, 7, 15

[56] References Cited

U.S. PATENT DOCUMENTS

| | | | |
|---|---|---|---|
| 2,140,295 | 12/1988 | Mallard | 464/143 X |
| 2,968,936 | 1/1961 | Croset | 464/141 |
| 3,153,920 | 10/1964 | Ireland | 464/141 X |
| 4,772,246 | 9/1988 | Wenzel | 464/117 |
| 5,000,723 | 3/1991 | Livingstone | 464/141 X |

FOREIGN PATENT DOCUMENTS 47908 8/1979 U.S.S.R. ............... 464/141

Primary Examiner—Daniel P. Stodola
Attorney, Agent, or Firm—Davis, Bujold & Streck

[57] ABSTRACT

A Sealed Downhole Motor Drive Shaft Universal Joint Assembly consisting of a housing with an interior and an exterior surface. The interior has an end wall and side walls. The end wall has an elongate projection with a concave terminus. The side walls have a plurality of slots. A shaft is provided having an exterior surface and opposed ends. Each of the ends has a central cavity with a substantially concave end wall. The exterior surface of the drive shaft has a plurality of annularly spaced pockets adjacent each end. The pockets are in substantial alignment with the end wall of the central cavity. Each end of the drive shaft is telescopically received within one of the housings. A thrust ball is positioned between the concave terminus of the elongate projection of the housing and the concave end wall of the central cavity of the shaft thereby transmitting thrust loads between the housing and the shaft while permitting omni-directional relative movement of the housing and the shaft. A plurality of ball bearings are positioned in the pockets of the shaft and the slots of the housing thereby transmitting radial loads between the housing and the shaft while permitting omni-directional relative movement of the housing and the shaft. An end cap engages the external surface of the housing thereby preventing the separation of the shaft and the housing. Seals are disposed between the end cap and the housing to prevent the entry of drilling fluids into the housing.

1 Claim, 2 Drawing Sheets

SEALED DOWNHOLE MOTOR DRIVE SHAFT UNIVERSAL JOINT ASSEMBLY

BACKGROUND OF THE INVENTION

The output shaft of a Downhole motor used within the oil industry for earth boring operations moves in an eccentric fashion. This accentric movement must be converted into a concentric movement for the drill bit to perform its intended function. At the present time this conversion is accomplished by means of a drive shaft having universal joint connections which connects the downhole motor to a bearing assembly rotating the drill bit.

The penetration of abrasive drilling fluids into the drive shaft universal joint assembly has an adverse effect on the operational life of the drive shafts. In order to prolong this operational life, attempts have been made to seal the universal joint assemblies. The universal joint assemblies of most drive shafts do not readily lend themselves to sealing. It has therefore come to be the practise to secure a lubricant filled rubber sleeve over the universal joint. This sleeve has a number of recognized disadvantages. It is common for it to slide out of position, where it can become damaged so it no longer serves its intended function, or can move into a position where it interferes with drilling operations.

SUMMARY OF THE INVENTION

What is required is a sealed drive shaft universal joint assembly.

According to the invention there is provided a Sealed Downhole Motor Drive Shaft Universal Joint Assembly, which is comprised of a housing with an interior and an exterior surface. The interior has an end wall and side walls. The end wall has an elongate projection with a concave terminus. The side walls have a plurality of slots. A shaft is provided having an exterior surface and opposed ends. Each of the ends has a central cavity with a substantially concave end wall. The exterior surface of the drive shaft has a plurality of annularly spaced pockets adjacent each end. The pockets are in substantial alignment with the end wall of the central cavity. Each end of the drive shaft is telescopically received within one of the housings. A thrust ball is positioned between the concave terminus of the elongate projection of the housing and the concave end wall of the central cavity of the shaft thereby transmitting thrust loads between the housing and the shaft while permitting limited omni-directional relative movement of the housing and the shaft. A plurality of ball bearings are positioned in the annularly spaced pockets of the shaft and the arcuate slots of the housing thereby transmitting radial loads between the housing and the shaft while permitting omni-directional relative movement of the housing and the shaft. An end cap engages the external surface of the housing thereby preventing the separation of the shaft and the housing. Seals are disposed between the end cap and the housing to prevent the entry of drilling fluids into the housing.

Although beneficial results may be obtained through the use of the drive shaft universal joint assembly as described, seal wear occurs whenever the pressures on opposite faces of a seal are unequal. Even more beneficial results may therefore be obtained by having a passage extending though the housing such that drilling fluids enter the passage thereby creating an internal pressure within the lubricant filled interior of the housing which is equal to external pressure.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
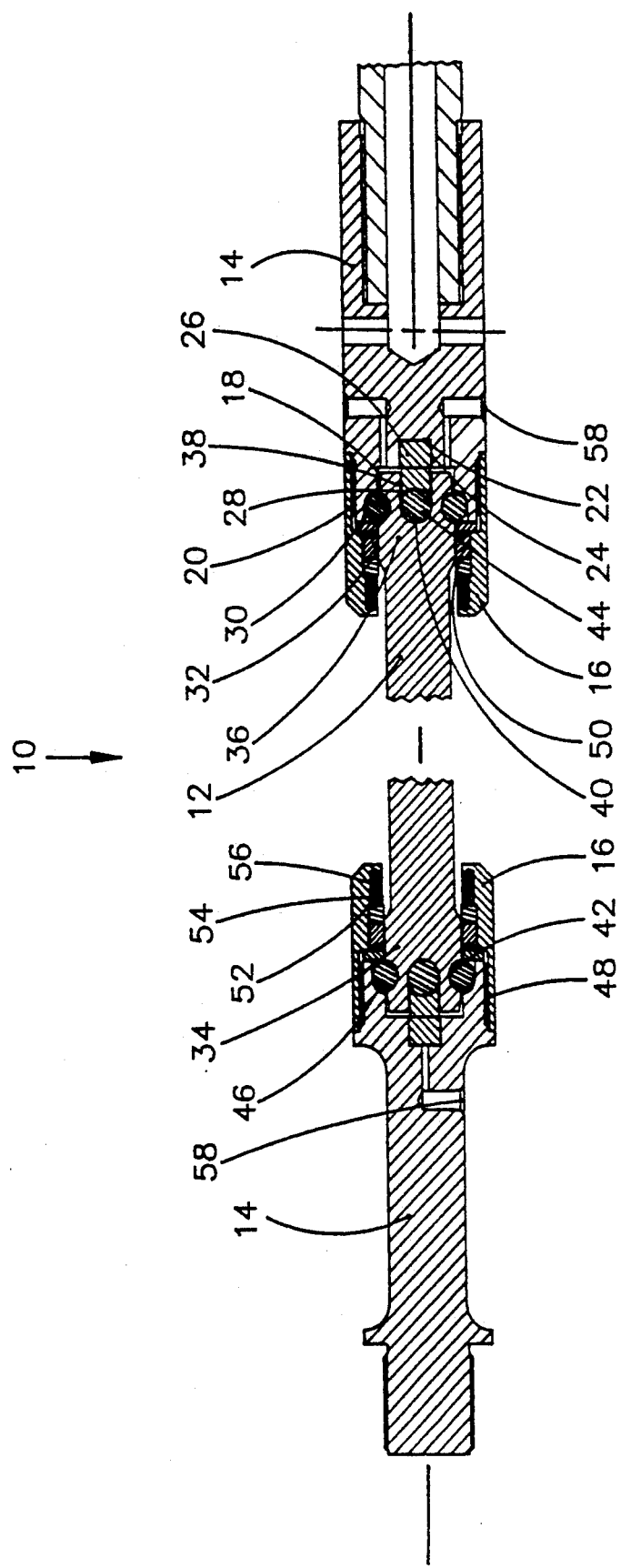
FIG. 1 is a longitudinal section view of a downhole drive shaft universal joint assembly made in accordance with the invention.
Figure 2:
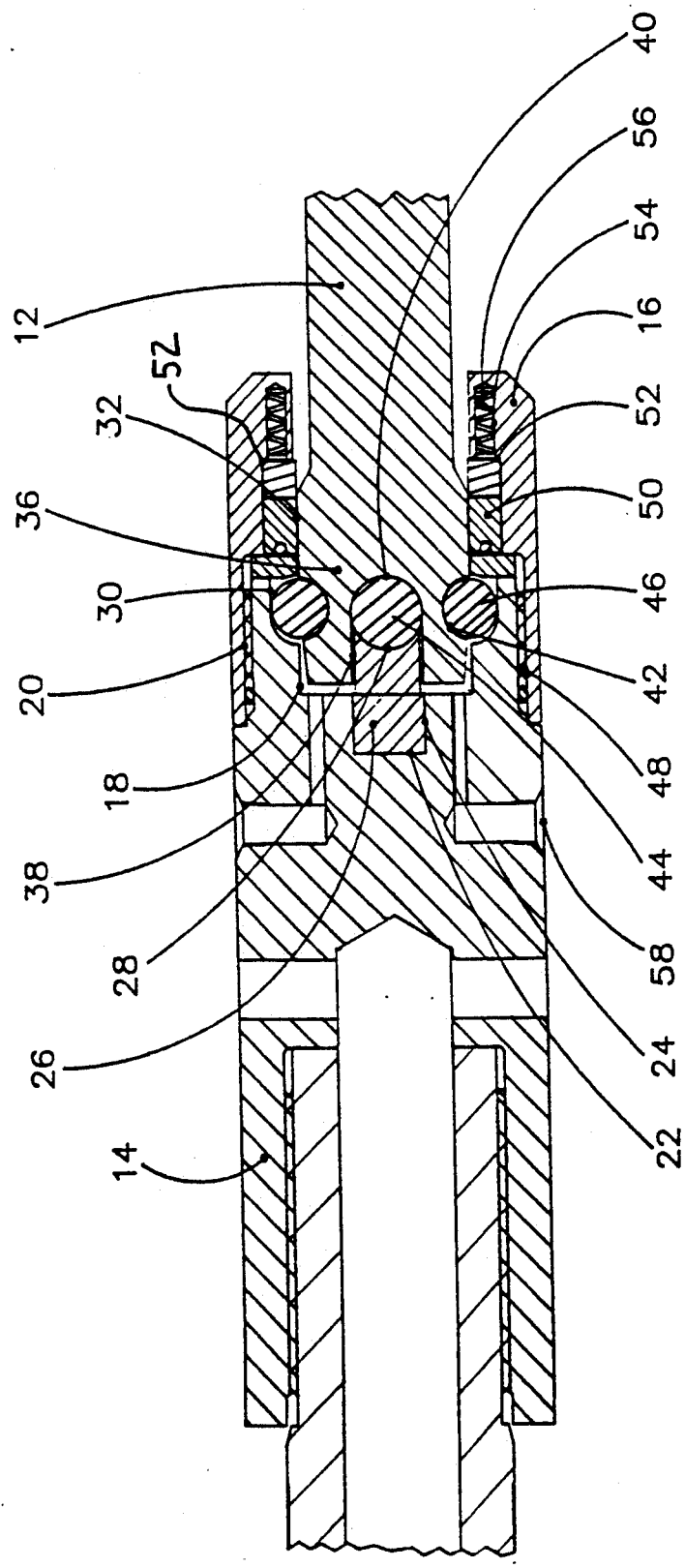
FIG. 2 is a longitudinal section view of a portion of the downhole drive shaft universal joint assembly illustrated in FIG. 1.

The invention, a sealed downhole drive shaft universal joint assembly generally identified by reference numeral 10, will now be described with reference to FIGS. 1 and 2. The primary components of sealed downhole drive shaft universal joint assembly 10 are a shaft 12, a pair of housings 14, and an end cap 16.

Each of housing 14 have an interior 18 and an exterior surface 20. Interior 18 is defined by an end wall 22 and side walls 24. End wall 22 has an elongate projection 26 with a concave terminus 28. Side walls 24 have a plurality of longitudinally extending slots 30. Shaft 12 has an exterior surface 32 and opposed ends 34 and 36. Each of ends 34 and 36 has a central cavity 38 with a substantially concave end wall 40. Exterior surface 32 of shaft 12 has a plurality of annularly spaced pockets 42 adjacent each of ends 34 and 36. Annularly spaced pockets 42 are in substantial alignment with end wall 40 of central cavity 38. Each of ends 34 and 36 of shaft 12 are telescopically received within a housings 14.

A thrust ball 44 is positioned between concave terminus 28 of elongate projection 26 of housing 14 and concave end wall 40 of central cavity 38 of shaft 12. A plurality of ball bearings 46 are positioned in annularly spaced pockets 42 of shaft 12 and slots 30 of housing 14.

End cap 16 engages external surface 20 of housing 14 by means of a mating threaded engagement 48. Polypack seals 50 are disposed between an annular shoulder 52 of end cap 16 and housing 14. Shoulder 52 has a plurality of cavities 54 in which are disposed springs 56 which urge seals 50 into sealing engagement with housing 14. A passage 58 extends through housing 14.

The use and operation of downhole drive shaft universal joint assembly will now be described with reference to FIGS. 1 and 2. In operation thrust ball 44 transmits thrust loads between housing 14 and shaft 12 while permitting limited omni-directional relative movement of housing 14 and shaft 12. This is possible due to the sliding contact between thrust ball 44 and the concave surfaces which it engages; namely, concave terminus 28 and concave end wall 40. In operation, ball bearings 46 transmit radial loads between housing 14 and shaft 12 while permitting limited omni-directional relative movement of housing 14 and shaft 12. This is possible due to the sliding contact between ball bearings 46 and the surfaces which contain them; namely, slots 30 and pockets 42. End cap 16 prevents the separation of shaft 12 and housing 14. Seals 50 prevent the entry of drilling fluids into interior 18 of housing 14. Passage 58 serves a pressure balancing function. Interior 18 of housing 14 is filled with a thick lubricant. Drilling fluids enter passage 58 and exert a pressure upon the lubricant. This creates an internal pressure within the lubricant filled interior 18 of housing 14 which is equal to external pressure.

It will be apparent to one skilled in the art that the present invention represents an improvement over the rubber sleeve method of sealing prevalent in the art. It will also be apparent to one skilled in the art that modifications may be made to the illustrated embodiment without departing from the spirit and scope of the invention.

The embodiments of the invention in which an exclusive property of privilege is claimed are defined as follows:

1. A bi-directional sealed downhole motor drive shaft universal joint assembly comprising:
   a) a housing with an interior and an exterior surface, the interior surface having an end wall, and side walls, the end wall having an elongate projection with a concave terminus, the side walls having a plurality of slots;
   b) a shaft with an exterior surface and opposed ends, each of the ends having a central cavity with a substantially concave end wall, the exterior surface of the drive shaft having a plurality of annularly spaced pockets adjacent each end, the pockets being in substantial alignment with the end wall of the central cavity, the drive shaft being telescopically received within the housing;
   c) a thrust ball positioned between the concave terminus of the elongate projection of the housing and the concave end wall of the central cavity of the shaft thereby transmitting thrust loads between the housing and the shaft while permitting limited omni-directional relative movement of the housing and the shaft;
   d) a plurality of ball bearings positioned in the annularly spaced pockets of the shaft and the slots of the housing thereby transmitting radial loads between the housing and the shaft while permitting limited omni-directional relative movement of the housing and the shaft;
   e) an end cap which engages the external surface of the housing thereby preventing the separation of the shaft and the housing;
   f) seals disposed between the end cap and the housing to prevent the entry of drilling fluids into the housing; and
   g) passage means, extending from the housing exterior surface through the housing to the housing end wall, for continuously allowing, in use, drilling fluids to enter the passage means and communicate with a lubricant filled interior of the housing thereby creating an internal pressure within the lubricant filled interior of the housing which is equal to pressure external of the universal joint assembly.

* * * * *